(12) United States Patent
Abotabl et al.

(10) Patent No.: US 12,058,658 B2
(45) Date of Patent: Aug. 6, 2024

(54) DYNAMIC GUARD BAND SIGNALING FOR FULL-DUPLEX COMMUNICATIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 17/446,586

(22) Filed: Aug. 31, 2021

(65) Prior Publication Data

US 2023/0061324 A1 Mar. 2, 2023

(51) Int. Cl.
| | |
|---|---|
| *H04L 12/28* | (2006.01) |
| *H04L 5/00* | (2006.01) |
| *H04W 72/0453* | (2023.01) |
| *H04W 72/23* | (2023.01) |
| *H04J 1/16* | (2006.01) |

(52) U.S. Cl.
CPC ....... *H04W 72/0453* (2013.01); *H04L 5/0092* (2013.01); *H04W 72/23* (2023.01)

(58) Field of Classification Search
CPC .......... H04W 72/0453; H04W 72/232; H04W 72/231; H04L 27/2646; H04L 27/2691; H04L 5/14
USPC ........................................ 370/252, 329, 430
See application file for complete search history.

(56) References Cited

U.S. PATENT DOCUMENTS

| | | | |
|---|---|---|---|
| 2019/0268198 A1* | 8/2019 | Oketani | H04L 27/2607 |
| 2020/0021404 A1* | 1/2020 | Qin | H04L 5/0039 |
| 2020/0221402 A1* | 7/2020 | Zhang | H04W 56/001 |
| 2022/0104258 A1* | 3/2022 | Moon | H04L 5/0053 |
| 2022/0182160 A1* | 6/2022 | Su | H04B 17/309 |
| 2022/0272744 A1* | 8/2022 | Noh | H04L 5/0053 |
| 2022/0394741 A1* | 12/2022 | Jiang | H04L 5/003 |
| 2023/0247648 A1* | 8/2023 | Oh | H04L 1/0003 370/252 |
| 2023/0328704 A1* | 10/2023 | Oh | H04W 72/232 370/329 |

* cited by examiner

*Primary Examiner* — John Pezzlo
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a downlink control information (DCI) transmission that includes a guard band indication that indicates a guard band between an uplink frequency resource allocation and a downlink frequency resource allocation. The UE may communicate using the uplink frequency resource allocation and the downlink frequency resource allocation and based at least in part on the guard band. Numerous other aspects are described.

30 Claims, 8 Drawing Sheets

DYNAMIC GUARD BAND SIGNALING FOR FULL-DUPLEX COMMUNICATIONS

FIELD OF THE DISCLOSURE

Aspects of the present disclosure generally relate to wireless communication and to techniques and apparatuses for dynamic guard band signaling for full-duplex communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a downlink control information (DCI) transmission that includes a guard band indication that indicates a guard band between an uplink frequency resource allocation and a downlink frequency resource allocation. The method may include communicating using the uplink frequency resource allocation and the downlink frequency resource allocation and based at least in part on the guard band.

Some aspects described herein relate to a method of wireless communication performed by a base station. The method may include transmitting a DCI transmission that includes a guard band indication that indicates a guard band between an uplink frequency resource allocation and a downlink frequency resource allocation. The method may include communicating using at least one of the uplink frequency resource allocation or the downlink frequency resource allocation and based at least in part on the guard band.

Some aspects described herein relate to a UE for wireless communication. The user equipment may include a memory and one or more processors coupled to the memory. The one or more processors may be configured to receive a DCI transmission that includes a guard band indication that indicates a guard band between an uplink frequency resource allocation and a downlink frequency resource allocation. The one or more processors may be configured to communicate using the uplink frequency resource allocation and the downlink frequency resource allocation and based at least in part on the guard band.

Some aspects described herein relate to a base station for wireless communication. The base station may include a memory and one or more processors coupled to the memory. The one or more processors may be configured to transmit a DCI transmission that includes a guard band indication that indicates a guard band between an uplink frequency resource allocation and a downlink frequency resource allocation. The one or more processors may be configured to communicate using at least one of the uplink frequency resource allocation or the downlink frequency resource allocation and based at least in part on the guard band.

Some aspects described herein relate to a non-transitory computer-readable medium that stores a set of instructions for wireless communication by a UE. The set of instructions, when executed by one or more processors of the UE, may cause the UE to receive a DCI transmission that includes a guard band indication that indicates a guard band between an uplink frequency resource allocation and a downlink frequency resource allocation. The set of instructions, when executed by one or more processors of the UE, may cause the UE to communicate using the uplink frequency resource allocation and the downlink frequency resource allocation and based at least in part on the guard band.

Some aspects described herein relate to a non-transitory computer-readable medium that stores a set of instructions for wireless communication by a base station. The set of instructions, when executed by one or more processors of the base station, may cause the base station to transmit a DCI transmission that includes a guard band indication that indicates a guard band between an uplink frequency resource allocation and a downlink frequency resource allocation. The set of instructions, when executed by one or more processors of the base station, may cause the base station to communicate using at least one of the uplink frequency resource allocation or the downlink frequency resource allocation and based at least in part on the guard band.

Some aspects described herein relate to an apparatus for wireless communication. The apparatus may include means for receiving a DCI transmission that includes a guard band indication that indicates a guard band between an uplink frequency resource allocation and a downlink frequency resource allocation. The apparatus may include means for communicating using the uplink frequency resource allocation and the downlink frequency resource allocation and based at least in part on the guard band.

Some aspects described herein relate to an apparatus for wireless communication. The apparatus may include means for transmitting a DCI transmission that includes a guard band indication that indicates a guard band between an uplink frequency resource allocation and a downlink frequency resource allocation. The apparatus may include means for communicating using at least one of the uplink frequency resource allocation or the downlink frequency resource allocation and based at least in part on the guard band.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
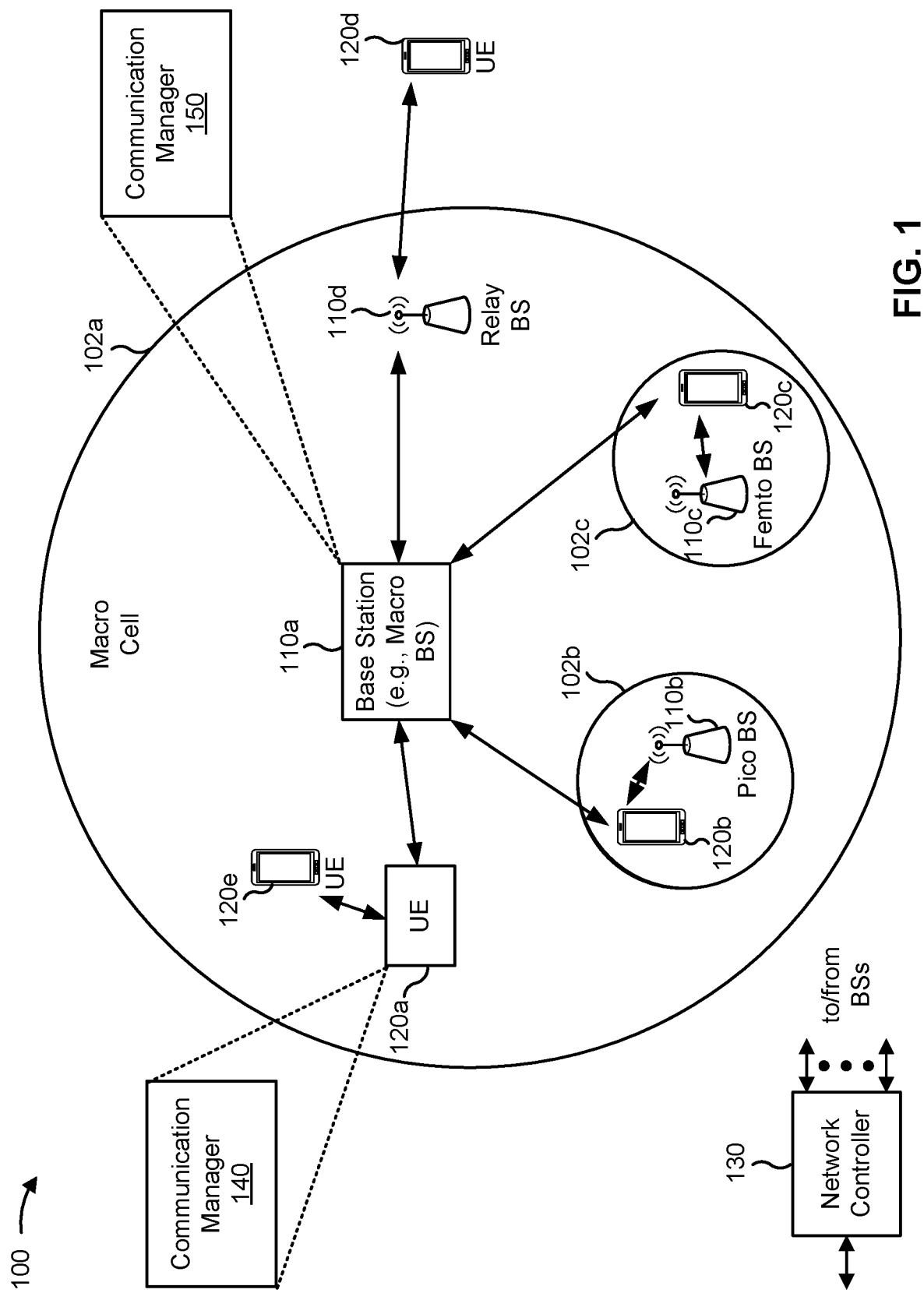
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a downlink control information (DCI) transmission that includes a guard band indication that indicates a guard band between an uplink frequency resource allocation and a downlink frequency resource allocation; and communicate using the uplink frequency resource allocation and the downlink frequency resource allocation and based at least in part on the guard band. Additionally, or alternatively, the communication manager 140 may perform one or more other operations described herein.

In some aspects, the base station 110 may include a communication manager 150. As described in more detail elsewhere herein, the communication manager 150 may transmit a DCI transmission that includes a guard band indication that indicates a guard band between an uplink frequency resource allocation and a downlink frequency resource allocation; and communicate using at least one of the uplink frequency resource allocation or the downlink frequency resource allocation and based at least in part on the guard band. Additionally, or alternatively, the communication manager 150 may perform one or more other operations described herein.

As indicated above, FIG. 1 is provided as an example. Other examples may differ from what is described with regard to FIG. 1.

Figure 2:
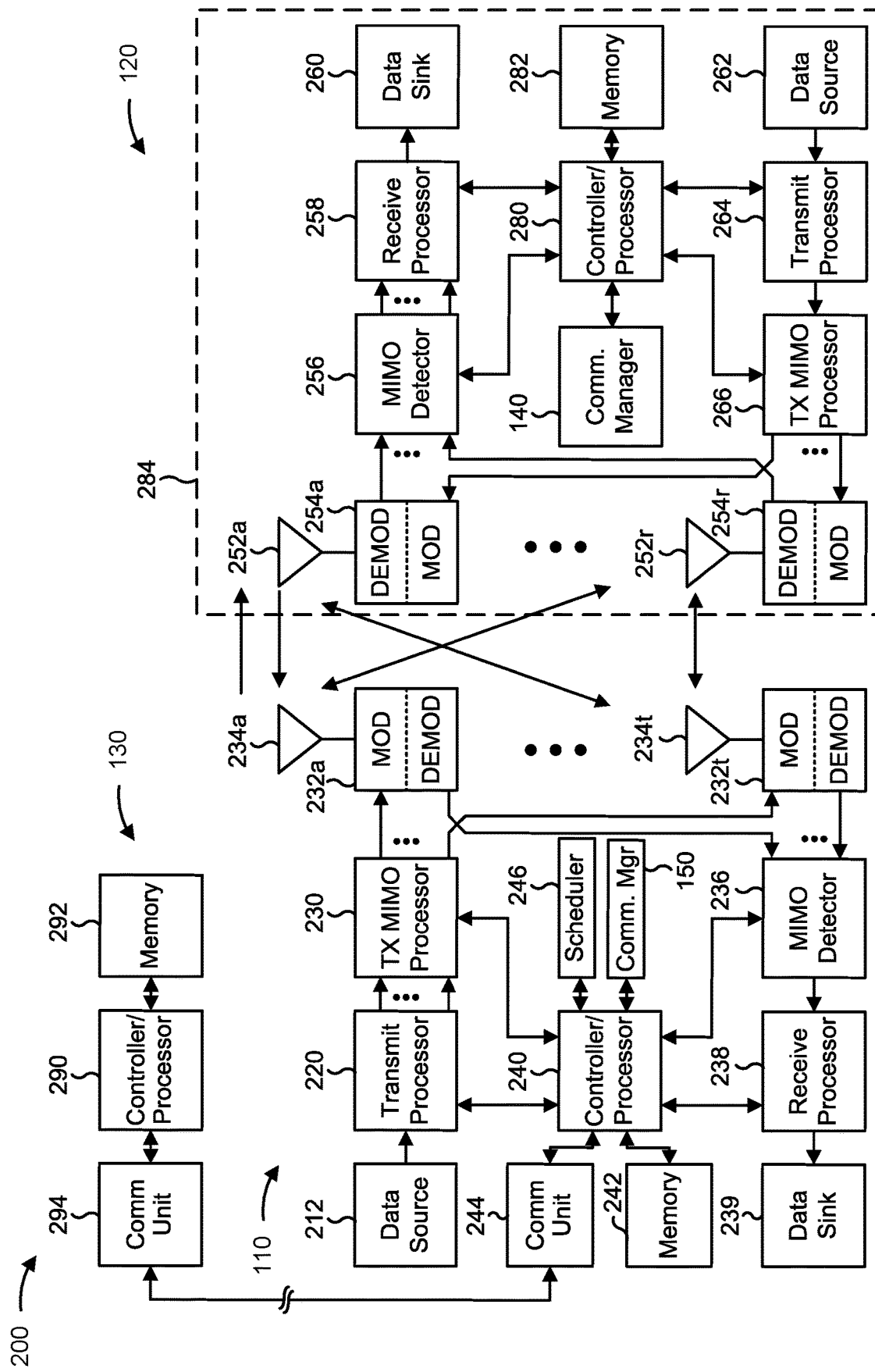
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with dynamic guard band signaling for full-duplex communications, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving a DCI transmission that includes a guard band indication that indicates a guard band between an uplink frequency resource allocation and a downlink frequency resource allocation (e.g., using antenna 252, modem 254, MIMO detector 256, receive processor 258, controller/processor 280, memory 282, or the like); and/or means for communicating using the uplink frequency resource allocation and the downlink frequency resource allocation and based at least in part on the guard band (e.g., using antenna 252, modem 254, MIMO detector 256, receive processor 258, controller/processor 280, memory 282, transmit processor 264, TX MIMO processor 266, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a DCI transmission that includes a guard band indication that indicates a guard band between an uplink frequency resource allocation and a downlink frequency resource allocation (e.g., using controller/processor 240, transmit processor 220, TX MIMO processor 230, modem 232, antenna 234, memory 242, or the like); and/or means for communicating using at least one of the uplink frequency resource allocation or the downlink frequency resource allocation and based at least in part on the guard band (e.g., using controller/processor 240, transmit processor 220, TX MIMO processor 230, MIMO detector 236, receive processor 238, modem 232, antenna 234, memory 242, or the like). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figures 3A, 3B, 3C:
FIGS. 3A-3C are diagrams illustrating examples of full duplex communication in accordance with the present disclosure.

FIGS. 3A-3C are diagrams illustrating examples 300, 310, 320 of full duplex communication in accordance with the present disclosure. The example 300 of FIG. 3A includes a UE1 302 and two base stations (e.g., TRPs) 304-1, 304-2, where the UE1 302 is sending uplink (UL) transmissions to base station 304-1 and is receiving downlink (DL) transmissions from base station 304-2. In the example 300 of FIG. 3A, full-duplex is enabled for the UE1 302, but not for the base stations 304-1, 304-2. The example 310 of FIG. 3B includes two UEs, shown as UE1 302-1 and UE2 302-2, and a base station 304, where the UE1 302-1 is receiving a DL transmission from the base station 304 and the UE2 302-2 is transmitting a UL transmission to the base station 304. In the example 310 of FIG. 3B, full-duplex is enabled for the base station 304, but not for UE1 302-1 and UE2 302-2. The example 320 of FIG. 3C includes a UE1 302 and a base station 304, where the UE1 302 is receiving a DL transmission from the base station 304 and the UE1 302 is transmitting a UL transmission to the base station 304. In the example 320 of FIG. 3C, full-duplex is enabled for both the UE1 302 and the base station 304.

Full-duplex communication provides essentially twice the bandwidth of half-duplex communication by allowing a device to transmit and receive on the same set of resources. However, different channels and/or signals may require different guard bands between the DL and UL to mitigate interference between the DL and UL communications. Also, if the UE is scheduled for UL, it might not expect any DL signaling separated by a specific guard band from the UL. This guard band may depend on the beam, the channel priority, and/or the transmission power, among other examples. Thus, the introduction of a static guard band may result in negative impacts to network performance.

Some aspects of techniques and apparatuses disclosed herein may facilitate dynamic signaling of guard bands for full-duplex communications. In some aspects, a base station may transmit, and a UE may receive a DCI transmission that includes a guard band indication. The guard band indication may indicate a guard band between an uplink frequency resource allocation and a downlink frequency resource allocation. The UE may communicate using the uplink frequency resource allocation and the downlink frequency resource allocation and based at least in part on the guard band. For example, as shown by reference number 330, the base station 304 may transmit, and the UE1 302 may receive, a DCI that includes a guard band indication. The UE1 302 may communicate (with the base station 304 or with another device) based at least in part on the guard band. The dynamic signaling of guard band may facilitate providing a full-duplex slot without significant implementation complexity, thereby having a positive impact on network performance.

As indicated above, FIGS. 3A-3C are provided as one or more examples. Other examples may differ from what is described with regard to FIGS. 3A-3C.

Figure 4:
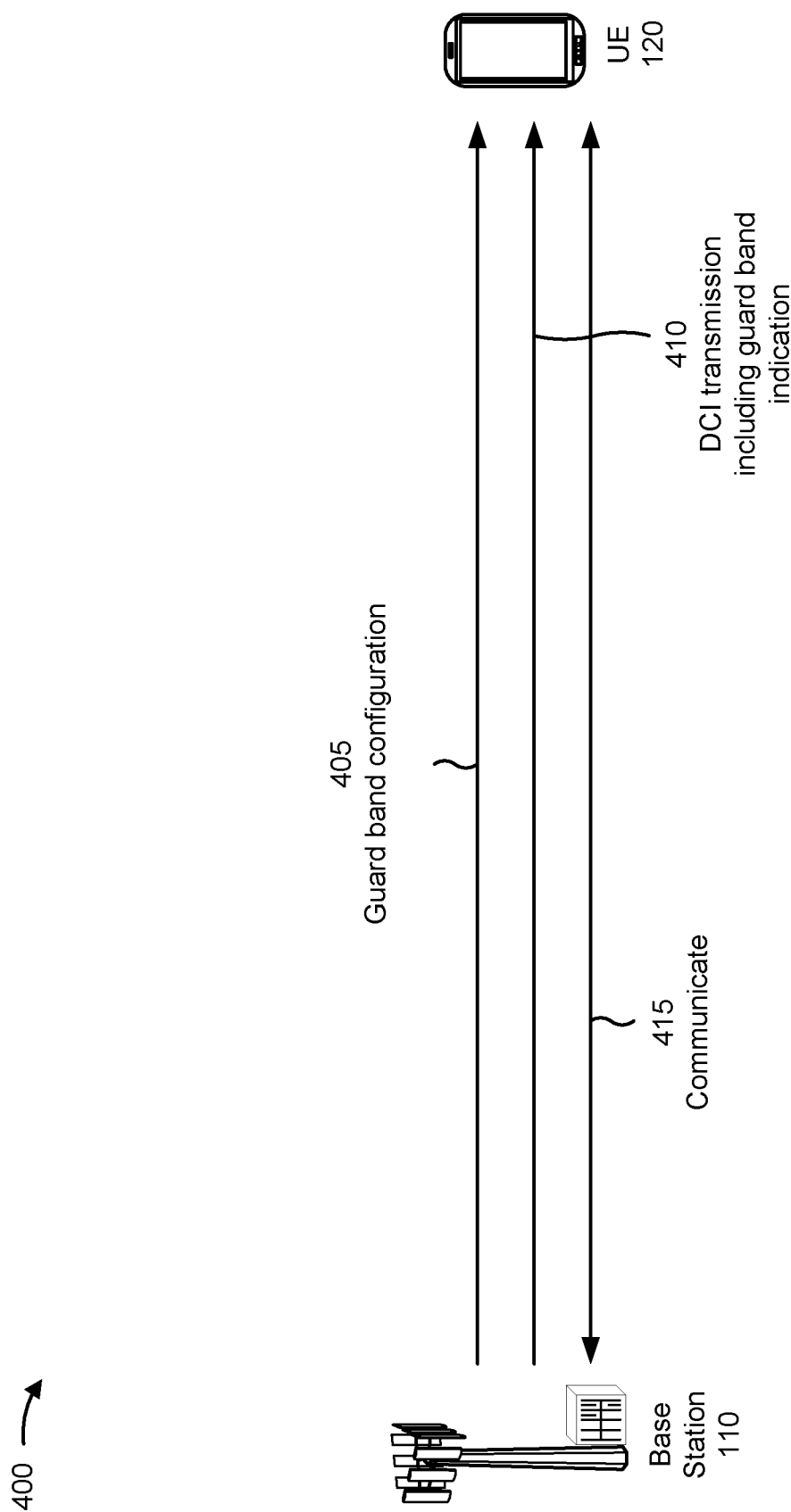
FIG. 4 is a diagram illustrating an example associated with dynamic guard band signaling for full-duplex communications, in accordance with the present disclosure.

FIG. 4 is a diagram illustrating an example 400 associated with virtual component carriers, in accordance with the present disclosure. As shown in FIG. 4, a base station 110 and a UE 120 may communicate with one another.

As shown by reference number 405, the base station may transmit, and the UE may receive, a message comprising a guard band configuration. The guard band configuration may indicate a guard band table indicating a plurality of possible guard bands. For example, in some aspects, the guard band indication includes a set of bits associated with a possible guard band of the plurality of possible guard bands in the guard band table. In some aspects, the guard band indication may indicate a reference subcarrier spacing (SCS) and may indicate a number of resource elements (REs) of the guard band or a number of resource blocks (RBs) of the guard band corresponding to the reference SCS. In some aspects, the guard band configuration may indicate a guard band indication field for scheduling DCI transmissions.

In some aspects, the guard band configuration may indicate a guard band table indicating a plurality of possible guard band sets that includes the set of guard bands. The guard band indication may include a set of bits corresponding to the set of guard bands. For example, as shown in Table 1, below, the guard band indication (GB indication) may correspond to a number of RBs based on the guard band (listed as "GB1," "GB2," and "GB3").

TABLE 1

| GB Indication | GB1 | GB2 | GB3 |
| --- | --- | --- | --- |
| 00 | 0 RBs | 3 RBs | 5 RBs |
| 01 | 3 RBs | 6 RBs | 8 RBs |
| 10 | 7 RBs | 10 RBs | 12 RBs |
| 11 | 10 RBs | 14 RBs | 20 RBs |

As shown by reference number 410, the base station 110 may transmit, and the UE 120 may receive a DCI transmission that includes a guard band indication. The guard band indication may indicate a guard band between an uplink frequency resource allocation and a downlink frequency resource allocation. The guard band indication may indicate at least one of a bandwidth of the guard band, a number of REs of the guard band, or a number of RBs of the guard band. The guard band indication may indicate the number of REs of the guard band or the number of RBs of the guard band corresponding to an SCS of a channel associated with the uplink frequency resource allocation and the downlink frequency resource allocation.

In some aspects, the guard band indication indicates a set of guard bands that includes the guard band. The UE 120 may select the guard band from the set of guard bands based at least in part on a self-interference analysis. In some aspects, the UE 120 may use blind decoding to determine whether a DCI transmission includes a guard band indication field. For example, in some aspects, the UE 120 may perform a first blind decoding of the DCI transmission based at least in part on a first hypothesis that the DCI transmission includes a guard band indication field. The UE 120 may perform a second blind decoding of the DCI transmission based at least in part on a second hypothesis that the DCI transmission does not include a guard band indication field. The UE 120 may identify the guard band indication based at least in part on a determination that the first blind decoding is successful.

As shown by reference number 415, the UE 120 may communicate using the uplink frequency resource allocation and the downlink frequency resource allocation and based at least in part on the guard band. In some aspects, for example, the UE 120 may communicate with the base station 110.

As indicated above, FIG. 4 is provided as an example. Other examples may differ from what is described with regard to FIG. 4.

Figure 5:
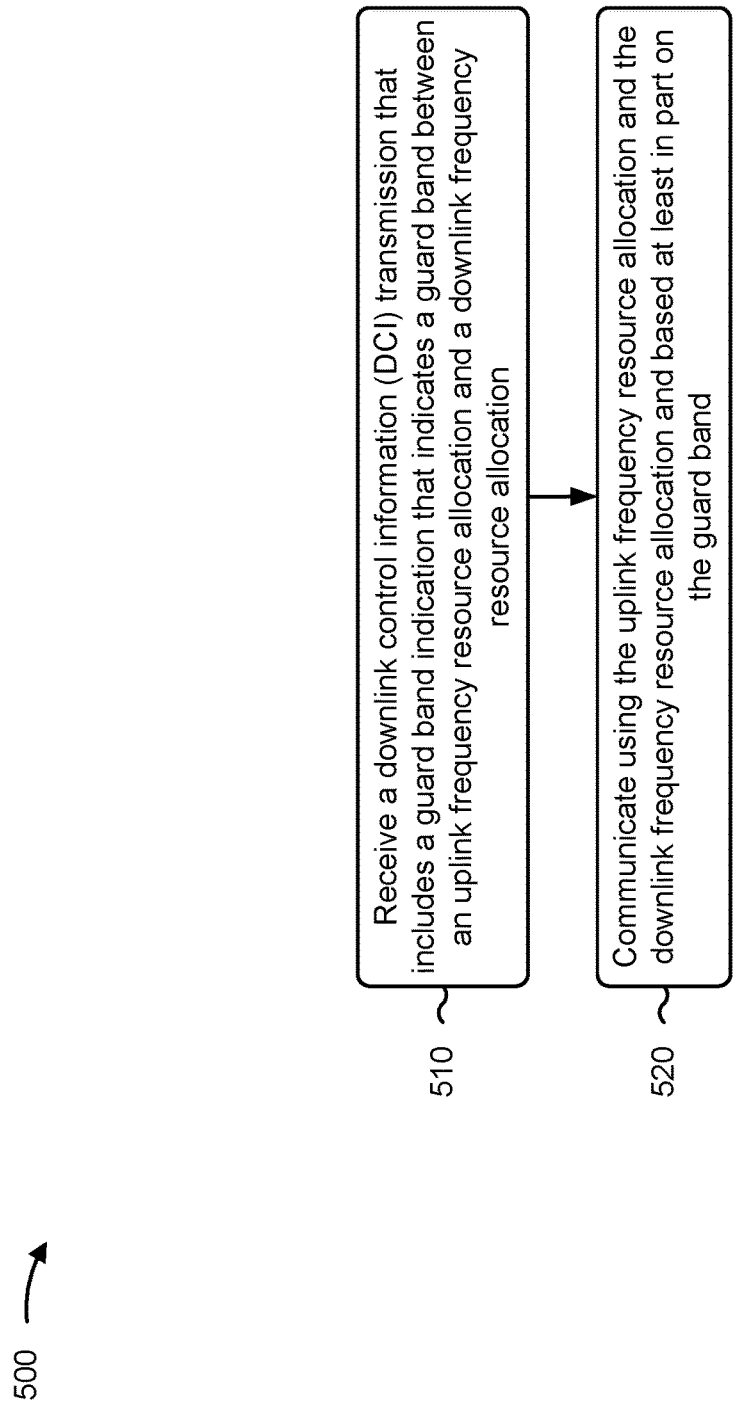
FIGS. 5 and 6 are diagrams illustrating example processes associated with dynamic guard band signaling for full-duplex communications, in accordance with the present disclosure.

FIG. 5 is a diagram illustrating an example process 500 performed, for example, by a UE, in accordance with the present disclosure. Example process 500 is an example where the UE (e.g., UE 120) performs operations associated with dynamic guard band signaling for full-duplex communications.

As shown in FIG. 5, in some aspects, process 500 may include receiving a DCI transmission that includes a guard band indication that indicates a guard band between an uplink frequency resource allocation and a downlink frequency resource allocation (block 510). For example, the UE (e.g., using communication manager 140 and/or reception component 702, depicted in FIG. 7) may receive a DCI transmission that includes a guard band indication that indicates a guard band between an uplink frequency resource allocation and a downlink frequency resource allocation, as described above, for example, with reference to FIG. 4.

As further shown in FIG. 5, in some aspects, process 500 may include communicating using the uplink frequency resource allocation and the downlink frequency resource allocation and based at least in part on the guard band (block 520). For example, the UE (e.g., using communication manager 140, reception component 702, and/or transmission component 704, depicted in FIG. 7) may communicate using the uplink frequency resource allocation and the downlink frequency resource allocation and based at least in part on the guard band, as described above, for example, with reference to FIG. 4.

Process 500 may include additional aspects, such as any single aspect or any combination of aspects described below and/or in connection with one or more other processes described elsewhere herein.

In a first aspect, process 500 includes receiving a radio resource control (RRC) message comprising a guard band configuration that indicates a guard band table indicating a plurality of possible guard bands, wherein the guard band indication comprises a set of bits associated with a possible guard band of the plurality of possible guard bands in the guard band table.

In a second aspect, alone or in combination with the first aspect, the guard band indication indicates at least one of a bandwidth of the guard band, a number of REs of the guard band, or a number of RBs of the guard band.

In a third aspect, alone or in combination with the second aspect, the guard band indication indicates the number of REs of the guard band or the number of RBs of the guard band corresponding to an SCS of a channel associated with the uplink frequency resource allocation and the downlink frequency resource allocation.

In a fourth aspect, alone or in combination with one or more of the second through third aspects, process 500 includes receiving an RRC message comprising a guard band configuration that indicates an SCS, wherein the guard band indication indicates the number of REs of the guard band or the number of RBs of the guard band corresponding to the reference SCS.

In a fifth aspect, alone or in combination with one or more of the first through fourth aspects, process 500 includes receiving an RRC message comprising a guard band configuration that indicates a guard band indication field for scheduling DCI transmissions.

In a sixth aspect, alone or in combination with one or more of the first through fifth aspects, process 500 includes performing a first blind decoding of the DCI transmission based at least in part on a first hypothesis that the DCI transmission includes a guard band indication field, performing a second blind decoding of the DCI transmission based at least in part on a second hypothesis that the DCI transmission does not include a guard band indication field, and identifying the guard band indication based at least in part on a determination that the first blind decoding is successful.

In a seventh aspect, alone or in combination with one or more of the first through sixth aspects, the guard band indication indicates a set of guard bands that includes the guard band.

In an eighth aspect, alone or in combination with the seventh aspect, process 500 includes selecting the guard band from the set of guard bands based at least in part on a self-interference analysis.

In a ninth aspect, alone or in combination with one or more of the seventh through eighth aspects, process 500 includes receiving an RRC message comprising a guard band configuration that indicates a guard band table indicating a plurality of possible guard band sets that includes the set of guard bands, wherein the guard band indication comprises a set of bits corresponding to the set of guard bands.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
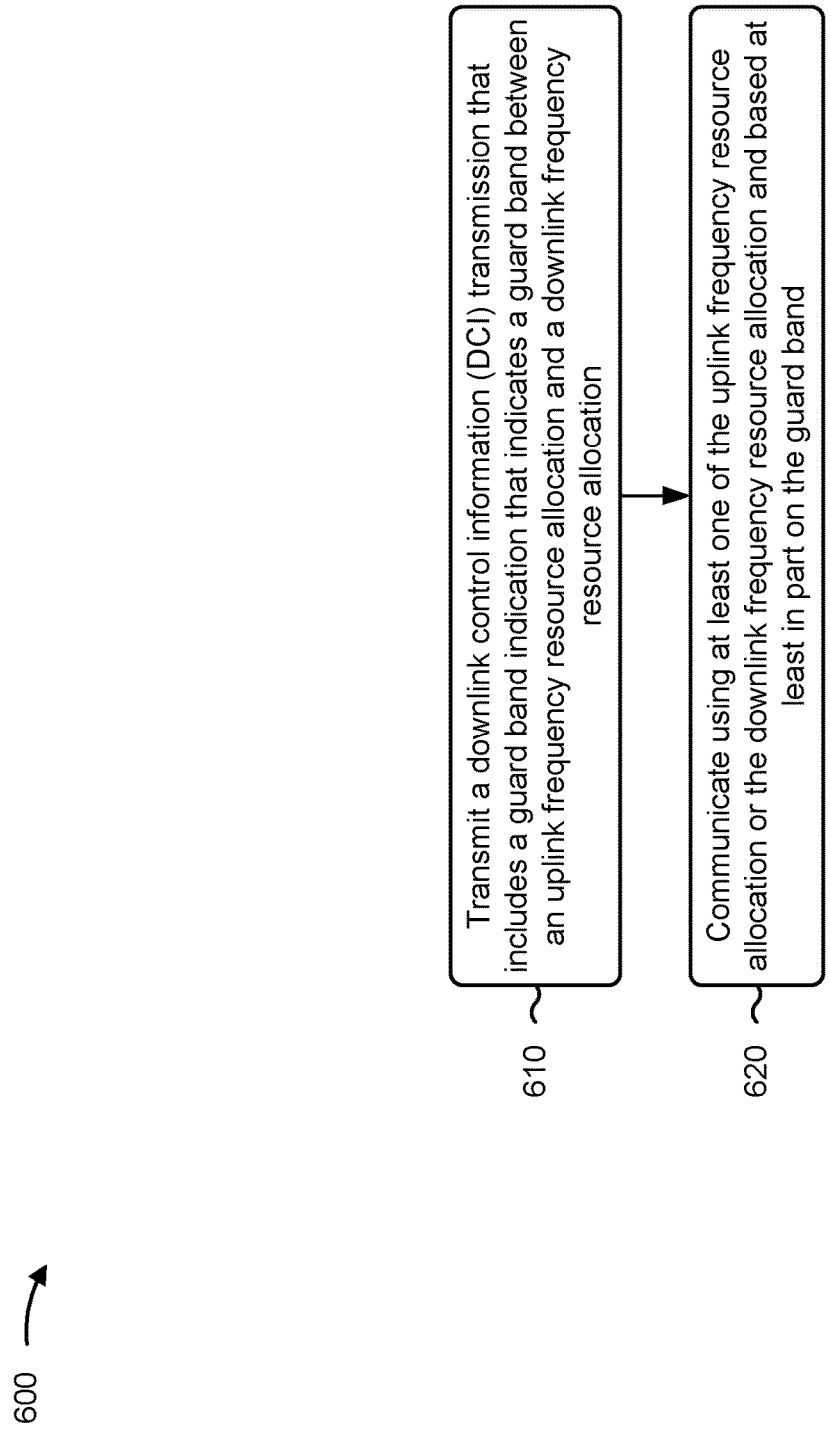

FIG. 6 is a diagram illustrating an example process 600 performed, for example, by a base station, in accordance with the present disclosure. Example process 600 is an example where the base station (e.g., base station 110) performs operations associated with dynamic guard band signaling for full-duplex communications.

As shown in FIG. 6, in some aspects, process 600 may include transmitting a DCI transmission that includes a guard band indication that indicates a guard band between an uplink frequency resource allocation and a downlink frequency resource allocation (block 610). For example, the base station (e.g., using communication manager 150 and/or transmission component 804, depicted in FIG. 8) may transmit a DCI transmission that includes a guard band indication that indicates a guard band between an uplink frequency resource allocation and a downlink frequency resource allocation, as described above, for example, with reference to FIG. 4.

As further shown in FIG. 6, in some aspects, process 600 may include communicating using at least one of the uplink frequency resource allocation or the downlink frequency resource allocation and based at least in part on the guard band (block 620). For example, the base station (e.g., using communication manager 150, reception component 802, and/or transmission component 804, depicted in FIG. 8) may communicate using at least one of the uplink frequency resource allocation or the downlink frequency resource allocation and based at least in part on the guard band, as described above, for example, with reference to FIG. 4.

Process 600 may include additional aspects, such as any single aspect or any combination of aspects described below and/or in connection with one or more other processes described elsewhere herein.

In a first aspect, process 600 includes transmitting an RRC message comprising a guard band configuration that indicates a guard band table indicating a plurality of possible guard bands, wherein the guard band indication comprises a set of bits associated with a possible guard band of the plurality of possible guard bands in the guard band table.

In a second aspect, alone or in combination with the first aspect, the guard band indication indicates at least one of a bandwidth of the guard band, a number of REs of the guard band, or a number of RBs of the guard band.

In a third aspect, alone or in combination with the second aspect, the guard band indication indicates the number of REs of the guard band or the number of RBs of the guard band corresponding to an SCS of a channel associated with the uplink frequency resource allocation and the downlink frequency resource allocation.

In a fourth aspect, alone or in combination with one or more of the second through third aspects, process 600 includes transmitting an RRC message comprising a guard band configuration that indicates a reference SCS, wherein the guard band indication indicates the number of REs of the guard band or the number of RBs of the guard band corresponding to the reference SCS.

In a fifth aspect, alone or in combination with one or more of the first through fourth aspects, process 600 includes transmitting an RRC message comprising a guard band configuration that indicates a guard band indication field for scheduling DCI transmissions.

In a sixth aspect, alone or in combination with one or more of the first through fifth aspects, the guard band indication indicates a set of guard bands that includes the guard band.

In a seventh aspect, alone or in combination with the sixth aspect, process 600 includes transmitting an RRC message comprising a guard band configuration that indicates a guard band table indicating a plurality of possible guard band sets that includes the set of guard bands, wherein the guard band indication comprises a set of bits corresponding to the set of guard bands.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
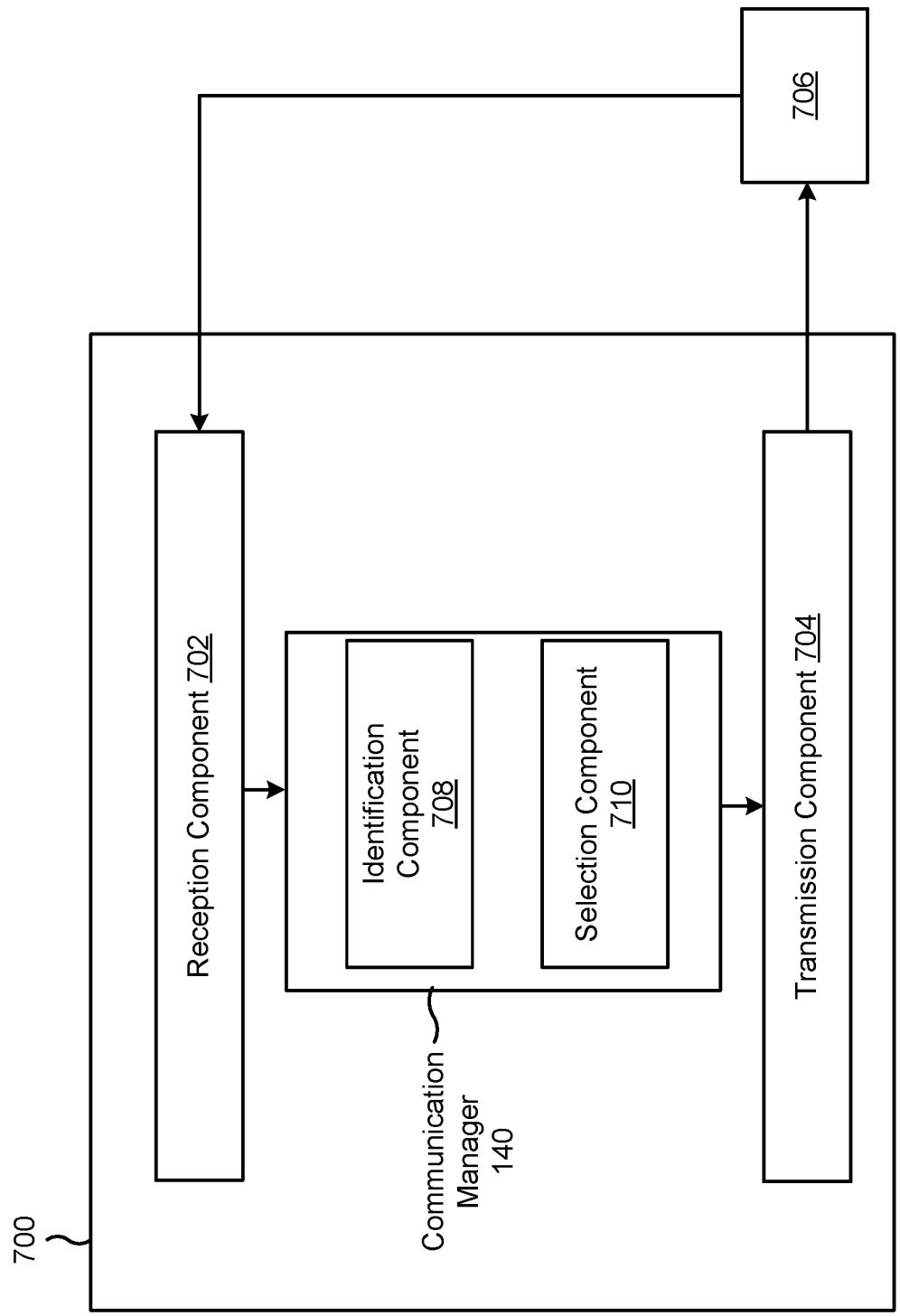
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of an identification component 708 or a selection component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a DCI transmission that includes a guard band indication that indicates a guard band between an uplink frequency resource allocation and a downlink frequency resource allocation. The reception component 702 and/or transmission component 704 may communicate using the uplink frequency resource allocation and the downlink frequency resource allocation and based at least in part on the guard band.

The reception component 702 may receive an RRC message comprising a guard band configuration that indicates a guard band table indicating a plurality of possible guard bands, wherein the guard band indication comprises a set of bits associated with a possible guard band of the plurality of possible guard bands in the guard band table. The reception component 702 may receive an RRC message comprising a guard band configuration that indicates a reference SCS, wherein the guard band indication indicates the number of REs of the guard band or the number of RBs of the guard band corresponding to the reference SCS.

The reception component 702 may receive an RRC message comprising a guard band configuration that indicates a guard band indication field for scheduling DCI transmissions.

The communication manager 140 and/or the reception component 702 may perform a first blind decoding of the DCI transmission based at least in part on a first hypothesis that the DCI transmission includes a guard band indication field. In some aspects, the communication manager 140 may include one or more antennas, a modem, a modulator, a transmit MIMO processor, a transmit processor, a controller/processor, a memory, or a combination thereof, of the UE described in connection with FIG. 2. In some aspects, the communication manager 140 may include the reception component 702 and/or the transmission component 704. The communication manager 140 and/or the reception component 702 may perform a second blind decoding of the DCI transmission based at least in part on a second hypothesis that the DCI transmission does not include a guard band indication field.

The identification component 708 may identify the guard band indication based at least in part on a determination that the first blind decoding is successful. In some aspects, the identification component 708 may include one or more antennas, a modem, a modulator, a transmit MIMO processor, a transmit processor, a controller/processor, a memory, or a combination thereof, of the UE described in connection with FIG. 2. In some aspects, the identification component 708 may include the reception component 702 and/or the transmission component 704.

The selection component 710 may select the guard band from the set of guard bands based at least in part on a self-interference analysis. In some aspects, the selection component 710 may include one or more antennas, a modem, a modulator, a transmit MIMO processor, a transmit processor, a controller/processor, a memory, or a combination thereof, of the UE described in connection with FIG. 2. In some aspects, the selection component 710 may include the reception component 702 and/or the transmission component 704. The reception component 702 may receive an RRC message comprising a guard band configuration that indicates a guard band table indicating a plurality of possible guard band sets that includes the set of guard bands, wherein the guard band indication comprises a set of bits corresponding to the set of guard bands.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
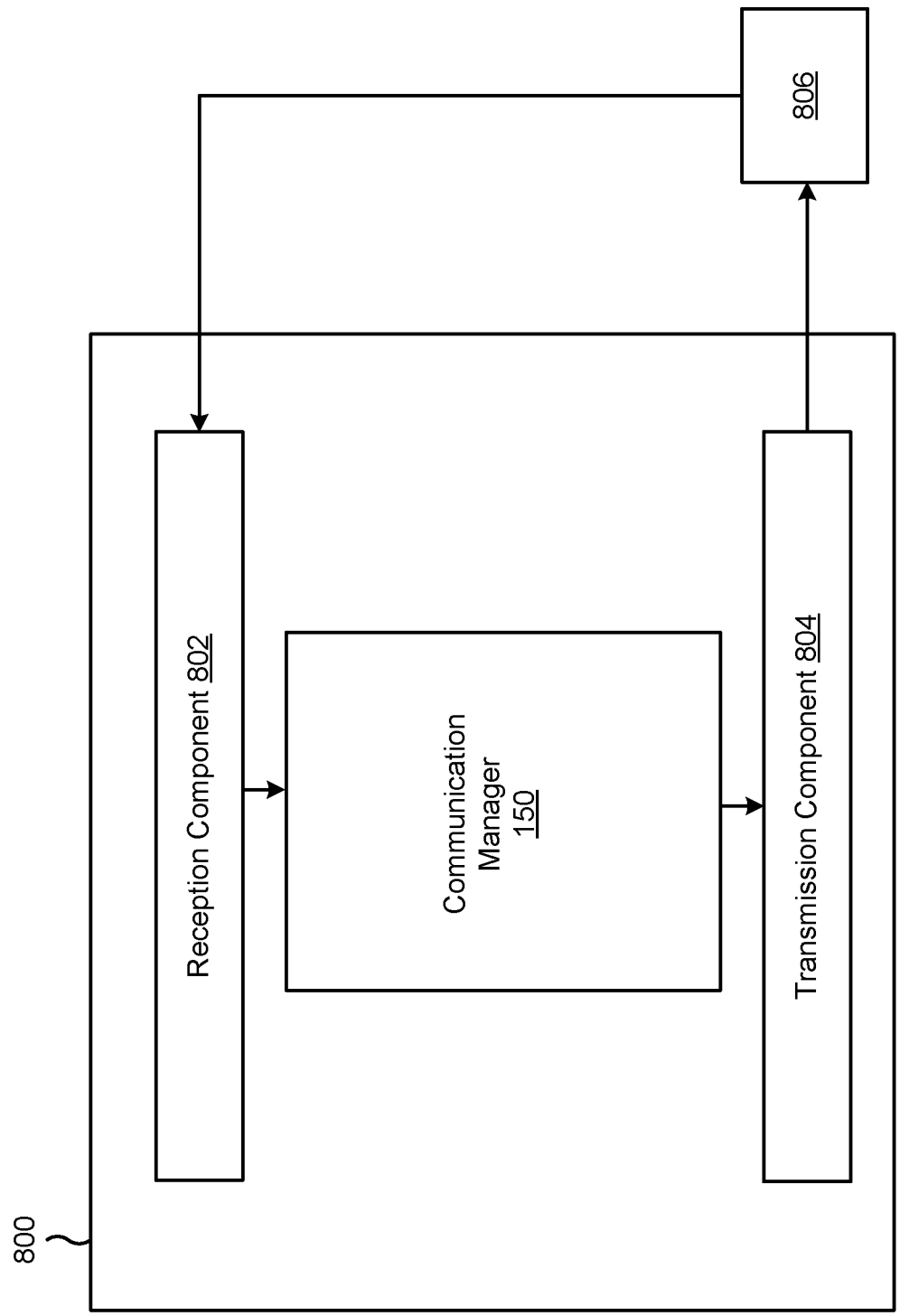

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit a DCI transmission that includes a guard band indication that indicates a guard band between an uplink frequency resource allocation and a downlink frequency resource allocation. The communication manager 150, reception component 802, and/or transmission component 804 may communicate using at least one of the uplink frequency resource allocation or the downlink frequency resource allocation and based at least in part on the guard band. In some aspects, the communication manager 150 may include one or more antennas, a modem, a modulator, a transmit MIMO processor, a transmit processor, a controller/processor, a memory, or a combination thereof, of the base station described in connection with FIG. 2. In some aspects, the communication manager 150 may include the reception component 802 and/or the transmission component 804.

The transmission component 804 may transmit an RRC message comprising a guard band configuration that indicates a guard band table indicating a plurality of possible guard bands, wherein the guard band indication comprises a set of bits associated with a possible guard band of the plurality of possible guard bands in the guard band table.

The transmission component 804 may transmit an RRC message comprising a guard band configuration that indicates a reference SCS, wherein the guard band indication indicates the number of REs of the guard band or the number of RBs of the guard band corresponding to the reference SCS.

The transmission component 804 may transmit an RRC message comprising a guard band configuration that indicates a guard band indication field for scheduling DCI transmissions. The transmission component 804 may transmit an RRC message comprising a guard band configuration that indicates a guard band table indicating a plurality of possible guard band sets that includes the set of guard bands, wherein the guard band indication comprises a set of bits corresponding to the set of guard bands.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a downlink control information (DCI) transmission that includes a guard band indication that indicates a guard band between an uplink frequency resource allocation and a downlink frequency resource allocation; and communicating using the uplink frequency resource allocation and the downlink frequency resource allocation and based at least in part on the guard band.

Aspect 2: The method of Aspect 1, further comprising receiving a radio resource control (RRC) message comprising a guard band configuration that indicates a guard band table indicating a plurality of possible guard bands, wherein the guard band indication comprises a set of bits associated with a possible guard band of the plurality of possible guard bands in the guard band table.

Aspect 3: The method of either of Aspects 1 or 2, wherein the guard band indication indicates at least one of a bandwidth of the guard band, a number of resource elements (REs) of the guard band, or a number of resource blocks (RBs) of the guard band.

Aspect 4: The method of Aspect 3, wherein the guard band indication indicates the number of REs of the guard band or the number of RBs of the guard band corresponding to a subcarrier spacing (SCS) of a channel associated with the uplink frequency resource allocation and the downlink frequency resource allocation.

Aspect 5: The method of either of Aspects 3 or 4, further comprising receiving a radio resource control (RRC) message comprising a guard band configuration that indicates a reference subcarrier spacing (SCS), wherein the guard band indication indicates the number of REs of the guard band or the number of RBs of the guard band corresponding to the reference SCS.

Aspect 6: The method of any of Aspects 1-5, further comprising receiving a radio resource control (RRC) message comprising a guard band configuration that indicates a guard band indication field for scheduling DCI transmissions.

Aspect 7: The method of any of Aspects 1-6, further comprising: performing a first blind decoding of the DCI transmission based at least in part on a first hypothesis that the DCI transmission includes a guard band indication field; performing a second blind decoding of the DCI transmission based at least in part on a second hypothesis that the DCI transmission does not include a guard band indication field; and identifying the guard band indication based at least in part on a determination that the first blind decoding is successful.

Aspect 8: The method of any of Aspects 1-7, wherein the guard band indication indicates a set of guard bands that includes the guard band.

Aspect 9: The method of Aspect 8, further comprising selecting the guard band from the set of guard bands based at least in part on a self-interference analysis.

Aspect 10: The method of either of Aspects 8 or 9, further comprising receiving a radio resource control (RRC) message comprising a guard band configuration that indicates a guard band table indicating a plurality of possible guard band sets that includes the set of guard bands, wherein the guard band indication comprises a set of bits corresponding to the set of guard bands.

Aspect 11: A method of wireless communication performed by a base station, comprising: transmitting a downlink control information (DCI) transmission that includes a guard band indication that indicates a guard band between an uplink frequency resource allocation and a downlink frequency resource allocation; and communicating using at least one of the uplink frequency resource allocation or the downlink frequency resource allocation and based at least in part on the guard band.

Aspect 12: The method of Aspect 11, further comprising transmitting a radio resource control (RRC) message comprising a guard band configuration that indicates a guard band table indicating a plurality of possible guard bands, wherein the guard band indication comprises a set of bits associated with a possible guard band of the plurality of possible guard bands in the guard band table.

Aspect 13: The method of either of Aspects 11 or 12, wherein the guard band indication indicates at least one of a bandwidth of the guard band, a number of resource elements (REs) of the guard band, or a number of resource blocks (RBs) of the guard band.

Aspect 14: The method of Aspect 13, wherein the guard band indication indicates the number of REs of the guard band or the number of RBs of the guard band corresponding to a subcarrier spacing (SCS) of a channel associated with the uplink frequency resource allocation and the downlink frequency resource allocation.

Aspect 15: The method of either of Aspects 13 or 14, further comprising transmitting a radio resource control (RRC) message comprising a guard band configuration that indicates a reference subcarrier spacing (SCS), wherein the guard band indication indicates the number of REs of the guard band or the number of RBs of the guard band corresponding to the reference SCS.

Aspect 16: The method of any of Aspects 11-15, further comprising transmitting a radio resource control (RRC) message comprising a guard band configuration that indicates a guard band indication field for scheduling DCI transmissions.

Aspect 17: The method of any of Aspects 11-16, wherein the guard band indication indicates a set of guard bands that includes the guard band.

Aspect 18: The method of Aspect 17, further comprising transmitting a radio resource control (RRC) message comprising a guard band configuration that indicates a guard band table indicating a plurality of possible guard band sets that includes the set of guard bands, wherein the guard band indication comprises a set of bits corresponding to the set of guard bands.

Aspect 19: An apparatus for wireless communication at a device, comprising a processor; memory coupled with the processor; and instructions stored in the memory and executable by the processor to cause the apparatus to perform the method of one or more of Aspects 1-10.

Aspect 20: A device for wireless communication, comprising a memory and one or more processors coupled to the memory, the one or more processors configured to perform the method of one or more of Aspects 1-10.

Aspect 21: An apparatus for wireless communication, comprising at least one means for performing the method of one or more of Aspects 1-10.

Aspect 22: A non-transitory computer-readable medium storing code for wireless communication, the code comprising instructions executable by a processor to perform the method of one or more of Aspects 1-10.

Aspect 23: A non-transitory computer-readable medium storing a set of instructions for wireless communication, the set of instructions comprising one or more instructions that, when executed by one or more processors of a device, cause the device to perform the method of one or more of Aspects 1-10.

Aspect 24: An apparatus for wireless communication at a device, comprising a processor; memory coupled with the processor; and instructions stored in the memory and executable by the processor to cause the apparatus to perform the method of one or more of Aspects 11-18.

Aspect 25: A device for wireless communication, comprising a memory and one or more processors coupled to the memory, the one or more processors configured to perform the method of one or more of Aspects 11-18.

Aspect 26: An apparatus for wireless communication, comprising at least one means for performing the method of one or more of Aspects 11-18.

Aspect 27: A non-transitory computer-readable medium storing code for wireless communication, the code comprising instructions executable by a processor to perform the method of one or more of Aspects 11-18.

Aspect 28: A non-transitory computer-readable medium storing a set of instructions for wireless communication, the set of instructions comprising one or more instructions that, when executed by one or more processors of a device, cause the device to perform the method of one or more of Aspects 11-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a radio resource control (RRC) message comprising a guard band configuration that indicates a plurality of possible guard band sets, wherein each possible guard band set includes a plurality of possible guard bands;
   receiving a downlink control information (DCI) transmission that includes a guard band indication that indicates a set of guard bands, from the plurality of possible guard band sets, that includes a guard band between an uplink frequency resource allocation and a downlink frequency resource allocation; and
   communicating using the uplink frequency resource allocation and the downlink frequency resource allocation and based at least in part on the guard band.

2. The method of claim 1, wherein the guard band indication indicates at least one of a bandwidth of the guard band, a number of resource elements (REs) of the guard band, or a number of resource blocks (RBs) of the guard band.

3. The method of claim 2, wherein the guard band indication indicates the number of REs of the guard band or the number of RBs of the guard band corresponding to a subcarrier spacing (SCS) of a channel associated with the uplink frequency resource allocation and the downlink frequency resource allocation.

4. The method of claim 2, wherein the guard band configuration indicates a reference subcarrier spacing (SCS), and wherein the guard band indication indicates the number of REs of the guard band or the number of RBs of the guard band corresponding to the reference SCS.

5. The method of claim 1, wherein the guard band configuration indicates a guard band indication field for scheduling DCI transmissions.

6. The method of claim 1, further comprising:
   performing a first blind decoding of the DCI transmission based at least in part on a first hypothesis that the DCI transmission includes a guard band indication field;
   performing a second blind decoding of the DCI transmission based at least in part on a second hypothesis that the DCI transmission does not include the guard band indication field; and
   identifying the guard band indication based at least in part on a determination that the first blind decoding is successful.

7. The method of claim 1, further comprising selecting the guard band from the set of guard bands based at least in part on a self-interference analysis.

8. The method of claim 1, wherein the guard band configuration indicates a guard band table indicating the plurality of possible guard band sets that includes the set of guard bands, and wherein the guard band indication comprises a set of bits corresponding to the set of guard bands.

9. The method of claim 1, wherein the guard band is for full-duplex communications by the UE, and wherein communicating using the uplink frequency resource allocation and the downlink frequency resource allocation is further based at least in part on full-duplex being enabled for the UE.

10. A method of wireless communication performed by a base station, comprising:
    transmitting a radio resource control (RRC) message comprising a guard band configuration that indicates a plurality of possible guard band sets, wherein each possible guard band set includes a plurality of possible guard bands;
    transmitting a downlink control information (DCI) transmission that includes a guard band indication that indicates a set of guard bands, from the plurality of possible guard band sets, that includes a guard band between an uplink frequency resource allocation and a downlink frequency resource allocation; and
    communicating using at least one of the uplink frequency resource allocation or the downlink frequency resource allocation and based at least in part on the guard band.

11. The method of claim 10, wherein the guard band indication indicates at least one of a bandwidth of the guard band, a number of resource elements (REs) of the guard band, or a number of resource blocks (RBs) of the guard band.

12. The method of claim 11, wherein the guard band indication indicates the number of REs of the guard band or the number of RBs of the guard band corresponding to a subcarrier spacing (SCS) of a channel associated with the uplink frequency resource allocation and the downlink frequency resource allocation.

13. The method of claim 11, wherein the guard band configuration indicates a reference subcarrier spacing (SCS), and wherein the guard band indication indicates the number of REs of the guard band or the number of RBs of the guard band corresponding to the reference SCS.

14. The method of claim 10, wherein the guard band configuration indicates a guard band indication field for scheduling DCI transmissions.

15. The method of claim 10, wherein the guard band configuration indicates a guard band table indicating the plurality of possible guard band sets that includes the set of guard bands, and wherein the guard band indication comprises a set of bits corresponding to the set of guard bands.

16. A user equipment (UE) for wireless communication, comprising:
    a memory; and
    one or more processors, coupled to the memory, configured to:
      receive a radio resource control (RRC) message comprising a guard band configuration that indicates a plurality of possible guard band sets, wherein each possible guard band set includes a plurality of possible guard bands;
      receive a downlink control information (DCI) transmission that includes a guard band indication that indicates a set of guard bands, from the plurality of possible guard band sets, that includes a guard band between an uplink frequency resource allocation and a downlink frequency resource allocation; and
      communicate using the uplink frequency resource allocation and the downlink frequency resource allocation and based at least in part on the guard band.

17. The UE of claim 16, wherein the guard band indication indicates at least one of a bandwidth of the guard band, a number of resource elements (REs) of the guard band, or a number of resource blocks (RBs) of the guard band.

18. The UE of claim 17, wherein the guard band indication indicates the number of REs of the guard band or the number of RBs of the guard band corresponding to a subcarrier spacing (SCS) of a channel associated with the uplink frequency resource allocation and the downlink frequency resource allocation.

19. The UE of claim 17, wherein the guard band configuration indicates a reference subcarrier spacing (SCS), and wherein the guard band indication indicates the number of REs of the guard band or the number of RBs of the guard band corresponding to the reference SCS.

20. The UE of claim 16, wherein the guard band configuration indicates a guard band indication field for scheduling DCI transmissions.

21. The UE of claim 16, wherein the one or more processors are further configured to:
perform a first blind decoding of the DCI transmission based at least in part on a first hypothesis that the DCI transmission includes a guard band indication field;
perform a second blind decoding of the DCI transmission based at least in part on a second hypothesis that the DCI transmission does not include the guard band indication field; and
identify the guard band indication based at least in part on a determination that the first blind decoding is successful.

22. The UE of claim 16, wherein the one or more processors are further configured to select the guard band from the set of guard bands based at least in part on a self-interference analysis.

23. The UE of claim 16, wherein the guard band is for full-duplex communications by the UE, and wherein communicating using the uplink frequency resource allocation and the downlink frequency resource allocation is further based at least in part on full-duplex being enabled for the UE.

24. The UE of claim 16, wherein the guard band configuration indicates a guard band table indicating the plurality of possible guard band sets that includes the set of guard bands, and wherein the guard band indication comprises a set of bits corresponding to the set of guard bands.

25. A base station for wireless communication, comprising:
a memory; and
one or more processors, coupled to the memory, configured to:
transmit a radio resource control (RRC) message comprising a guard band configuration that indicates a plurality of possible guard band sets, wherein each possible guard band set includes a plurality of possible guard bands;
transmit a downlink control information (DCI) transmission that includes a guard band indication that indicates a set of guard bands, from the plurality of possible guard band sets, that includes a guard band between an uplink frequency resource allocation and a downlink frequency resource allocation; and
communicate using at least one of the uplink frequency resource allocation or the downlink frequency resource allocation and based at least in part on the guard band.

26. The base station of claim 25, wherein the guard band indication indicates at least one of a bandwidth of the guard band, a number of resource elements (REs) of the guard band, or a number of resource blocks (RBs) of the guard band.

27. The base station of claim 26, wherein the guard band indication indicates the number of REs of the guard band or the number of RBs of the guard band corresponding to a subcarrier spacing (SCS) of a channel associated with the uplink frequency resource allocation and the downlink frequency resource allocation.

28. The base station of claim 26, wherein the guard band configuration indicates a reference subcarrier spacing (SCS), wherein the guard band indication indicates the number of REs of the guard band or the number of RBs of the guard band corresponding to the reference SCS.

29. The base station of claim 25, wherein the guard band configuration indicates a guard band indication field for scheduling DCI transmissions.

30. The base station of claim 25, wherein the guard band configuration indicates a guard band table indicating the plurality of possible guard band sets that includes the set of guard bands, and wherein the guard band indication comprises a set of bits corresponding to the set of guard bands.

* * * * *